United States Patent
Drumm

(10) Patent No.: US 9,170,683 B2
(45) Date of Patent: Oct. 27, 2015

(54) OPTICAL COUPLER FOR USE IN AN OPTICAL TOUCH SENSITIVE DEVICE

(75) Inventor: Owen Drumm, Dublin (IE)

(73) Assignee: Rapt IP Limited, Gibraltar (GI)

( * ) Notice: Subject to any disclaimer, the term of this patent is extended or adjusted under 35 U.S.C. 154(b) by 618 days.

(21) Appl. No.: 13/555,862

(22) Filed: Jul. 23, 2012

(65) Prior Publication Data

US 2013/0021302 A1    Jan. 24, 2013

Related U.S. Application Data

(60) Provisional application No. 61/510,989, filed on Jul. 22, 2011.

(51) Int. Cl.
- *G06F 3/042* (2006.01)
- *G02F 1/1333* (2006.01)
- *F21V 8/00* (2006.01)

(52) U.S. Cl.
CPC ............ *G06F 3/0421* (2013.01); *G06F 3/0428* (2013.01); *G02B 6/0028* (2013.01); *G02F 1/13338* (2013.01); *G06F 2203/04109* (2013.01)

(58) Field of Classification Search
CPC ................ G06F 3/0421; G06F 3/0428; G06F 2203/04109; G02F 1/13338; G02B 6/0028; G02B 6/24
USPC ........... 385/15, 31, 32, 39; 345/173, 175, 176
See application file for complete search history.

(56) References Cited

U.S. PATENT DOCUMENTS

| | | | |
|---|---|---|---|
| 3,673,327 A | 6/1972 | Johnson et al. | |
| 3,867,628 A | 2/1975 | Brown | |
| 4,067,925 A | 1/1978 | Zahner | |
| 4,243,879 A | 1/1981 | Carroll et al. | |

(Continued)

FOREIGN PATENT DOCUMENTS

| EP | 0304820 A2 | 3/1989 |
|---|---|---|
| EP | 0572009 A1 | 12/1993 |

(Continued)

OTHER PUBLICATIONS

PCT International Search Report and Written Opinion, PCT Application No. PCT/IB2012/001782, Jan. 24, 2013, 11 pages.

(Continued)

*Primary Examiner* — Daniel Petkovsek
(74) *Attorney, Agent, or Firm* — Fenwick & West LLP

(57) ABSTRACT

An optical touch-sensitive device is able to determine the locations of multiple simultaneous touch events. The optical touch-sensitive device includes multiple emitters and detectors coupled with an optical coupler assembly through a waveguide on the surface on the optical-touch sensitive device. The coupler may be side coupled or edge coupled to the waveguide. For both the side coupled or edge coupled cases, the coupler may also be configured to reorient beams to accommodate any orientation of emitters and detectors with respect to the waveguide. The coupler may also be configured to translate beams laterally or vertically to accommodate any position of emitters and detectors. The coupler, and touch-sensitive device more generally, are also configured to prevent ambient light entering the waveguide from hitting the emitters and detectors. Each emitter produces optical beams which are received by the detectors. Touch events disturb the optical beams.

14 Claims, 14 Drawing Sheets

(56) References Cited

U.S. PATENT DOCUMENTS

| | | | |
|---|---|---|---|
| 4,254,333 A | 3/1981 | Bergstrom | |
| 4,267,443 A | 5/1981 | Carroll et al. | |
| 4,459,476 A | 7/1984 | Weissmueller et al. | |
| 4,498,001 A | 2/1985 | Smoot | |
| 4,591,710 A | 5/1986 | Komadina et al. | |
| 4,684,801 A | 8/1987 | Carroll et al. | |
| 4,713,534 A | 12/1987 | Masters et al. | |
| 4,725,726 A | 2/1988 | Hasegawa et al. | |
| 4,746,770 A | 5/1988 | McAvinney | |
| 4,761,637 A | 8/1988 | Lucas et al. | |
| 4,799,044 A | 1/1989 | Masters et al. | |
| 4,916,308 A * | 4/1990 | Meadows | 250/221 |
| 4,943,806 A | 7/1990 | Masters et al. | |
| 4,963,859 A | 10/1990 | Parks | |
| 4,988,983 A | 1/1991 | Wehrer | |
| 5,136,156 A | 8/1992 | Nounen et al. | |
| 5,414,413 A * | 5/1995 | Tamaru et al. | 345/175 |
| 5,714,909 A | 2/1998 | Jackson | |
| 5,838,308 A | 11/1998 | Knapp et al. | |
| 6,172,667 B1 * | 1/2001 | Sayag | 345/175 |
| 6,181,842 B1 * | 1/2001 | Francis et al. | 385/14 |
| 6,495,832 B2 | 12/2002 | Kirby | |
| 6,556,149 B1 | 4/2003 | Reimer et al. | |
| 6,597,348 B1 | 7/2003 | Yamazaki et al. | |
| 6,765,193 B2 | 7/2004 | Sumriddetchkajorn | |
| 6,803,825 B2 | 10/2004 | Chiou et al. | |
| 6,972,753 B1 | 12/2005 | Kimura et al. | |
| 7,142,189 B2 * | 11/2006 | Engelmann | 345/102 |
| 7,265,748 B2 | 9/2007 | Ryynanen | |
| 7,310,090 B2 * | 12/2007 | Ho et al. | 345/175 |
| 7,355,593 B2 | 4/2008 | Hill et al. | |
| 7,385,170 B1 | 6/2008 | Krumberger | |
| 7,435,940 B2 | 10/2008 | Eliasson et al. | |
| 7,442,914 B2 | 10/2008 | Eliasson et al. | |
| 7,465,914 B2 | 12/2008 | Eliasson et al. | |
| 7,627,209 B2 * | 12/2009 | Hikita | 385/32 |
| 8,111,958 B2 * | 2/2012 | Nishio et al. | 385/33 |
| 8,144,271 B2 * | 3/2012 | Han | 349/12 |
| 8,218,154 B2 | 7/2012 | Østergaard et al. | |
| 8,384,674 B1 * | 2/2013 | Slothower et al. | 345/173 |
| 8,587,562 B2 * | 11/2013 | Goertz et al. | 345/175 |
| 8,674,963 B2 * | 3/2014 | Cornish et al. | 345/175 |
| 8,803,848 B2 * | 8/2014 | Suarez Rovere | 345/176 |
| 2004/0252091 A1 | 12/2004 | Ma et al. | |
| 2004/0263482 A1 | 12/2004 | Goertz | |
| 2005/0162398 A1 | 7/2005 | Eliasson et al. | |
| 2005/0271319 A1 * | 12/2005 | Graham | 385/14 |
| 2006/0114237 A1 | 6/2006 | Crockett et al. | |
| 2006/0114244 A1 * | 6/2006 | Saxena et al. | 345/175 |
| 2006/0227120 A1 | 10/2006 | Eikman | |
| 2006/0255248 A1 | 11/2006 | Eliasson | |
| 2007/0125937 A1 | 6/2007 | Eliasson et al. | |
| 2007/0152985 A1 | 7/2007 | Østergaard et al. | |
| 2007/0201042 A1 | 8/2007 | Eliasson et al. | |
| 2008/0007540 A1 | 1/2008 | Østergaard | |
| 2008/0007542 A1 | 1/2008 | Eliasson et al. | |
| 2008/0088603 A1 | 4/2008 | Eliasson et al. | |
| 2008/0189046 A1 | 8/2008 | Eliasson et al. | |
| 2009/0122020 A1 | 5/2009 | Eliasson et al. | |
| 2009/0135167 A1 | 5/2009 | Sakai et al. | |
| 2009/0273794 A1 | 11/2009 | Østergaard et al. | |
| 2010/0123682 A1 * | 5/2010 | Juni | 345/174 |
| 2010/0193259 A1 | 8/2010 | Wassvik | |
| 2011/0074734 A1 | 3/2011 | Wassvik et al. | |
| 2011/0074735 A1 | 3/2011 | Wassvik et al. | |
| 2011/0090176 A1 | 4/2011 | Christiansson et al. | |
| 2011/0102374 A1 | 5/2011 | Wassvik et al. | |
| 2011/0216042 A1 | 9/2011 | Wassvik et al. | |
| 2011/0227874 A1 | 9/2011 | Fåhraeus et al. | |
| 2012/0068973 A1 | 3/2012 | Christiansson et al. | |
| 2012/0153134 A1 | 6/2012 | Bergström et al. | |
| 2012/0154338 A1 | 6/2012 | Bergström et al. | |
| 2012/0162142 A1 | 6/2012 | Christiansson et al. | |
| 2012/0162144 A1 | 6/2012 | Fåhraeus et al. | |
| 2012/0169672 A1 | 7/2012 | Christiansson | |
| 2012/0200538 A1 | 8/2012 | Christiansson et al. | |
| 2012/0212441 A1 | 8/2012 | Christiansson et al. | |
| 2012/0256882 A1 | 10/2012 | Christiansson et al. | |
| 2012/0268403 A1 | 10/2012 | Christiansson | |
| 2013/0021300 A1 | 1/2013 | Wassvik | |
| 2013/0044073 A1 | 2/2013 | Christiansson et al. | |

FOREIGN PATENT DOCUMENTS

| | | |
|---|---|---|
| EP | 0601651 A1 | 6/1994 |
| GB | 2133537 A | 7/1984 |
| GB | 2171195 A | 8/1986 |
| WO | WO 02/095668 A1 | 11/2002 |
| WO | WO 2007/003196 A2 | 1/2007 |
| WO | WO 2007/048180 A1 | 5/2007 |
| WO | WO 2008/004103 A2 | 1/2008 |
| WO | WO 2011/035370 A1 | 3/2011 |

OTHER PUBLICATIONS

Cummings, T.F., "Transparent Keyless Keyboard for Variable Terminal Applications," IBM Technical Disclosure Bulletin, Sep. 1977, pp. 1609-1611, vol. 20, No. 4.

Baumann, D.D., "Optical Data Input Device," IBM Technical Disclosure Bulletin, Mar. 1969, pp. 1281-1282, vol. 11, No. 10.

Thompson, D.R., "Finger Position Detect Method," IBM Technical Disclosure Bulletin, Dec. 1980, p. 3289, vol. 23, No. 7B.

Callens, P., "Optical Keyboard Device and Technique," IBM Technical Disclosure Bulletin, Nov. 1983, pp. 2763-2764, vol. 26, No. 6.

"Enhanced Optical Touch Input Panel," IBM Technical Disclosure Bulletin, Sep. 1985, pp. 1760-1762, vol. 28, No. 4.

* cited by examiner

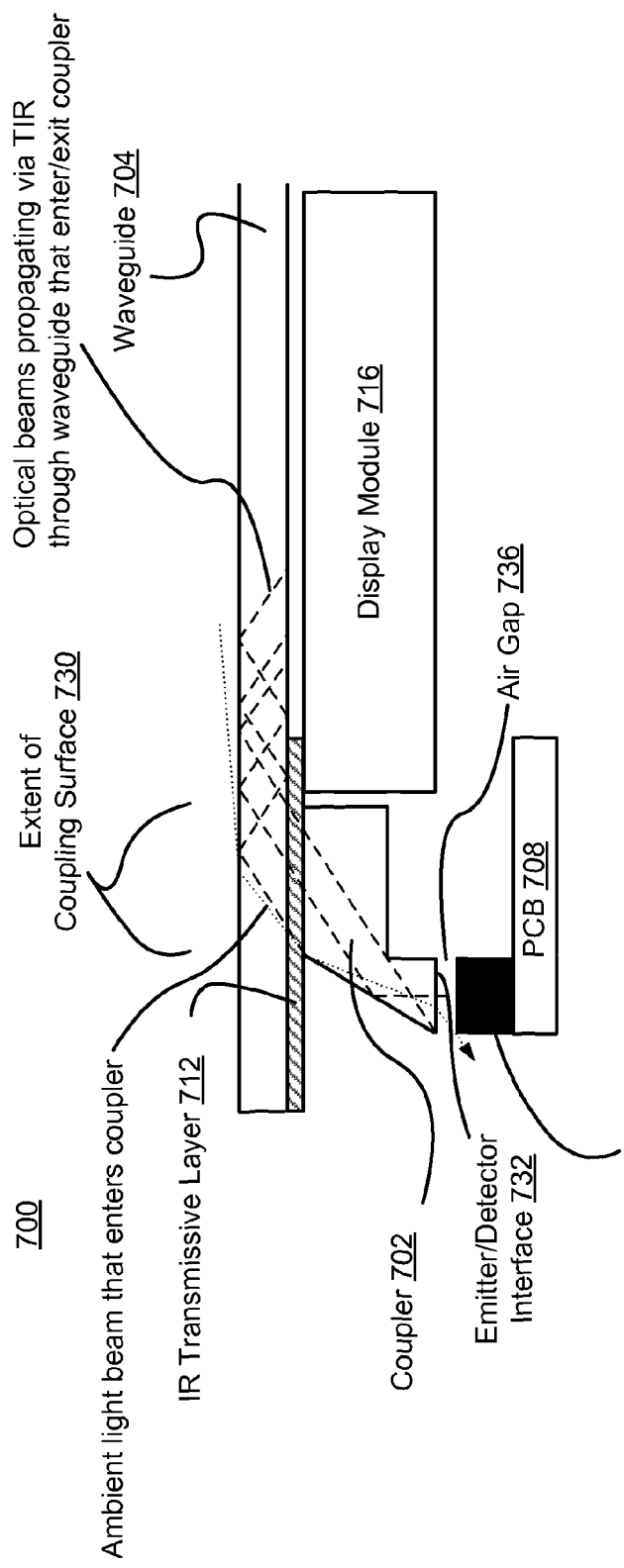
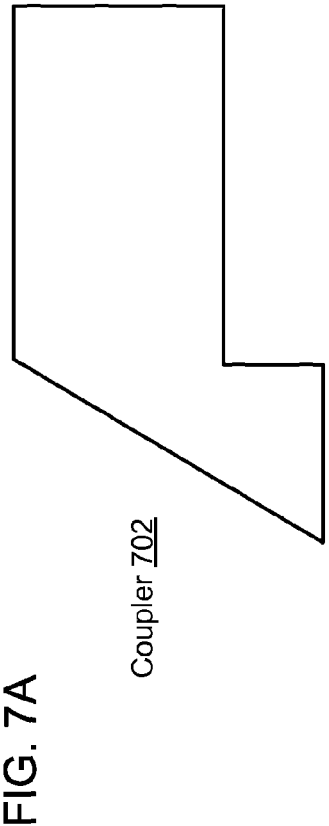
FIG. 7A
FIG. 7B

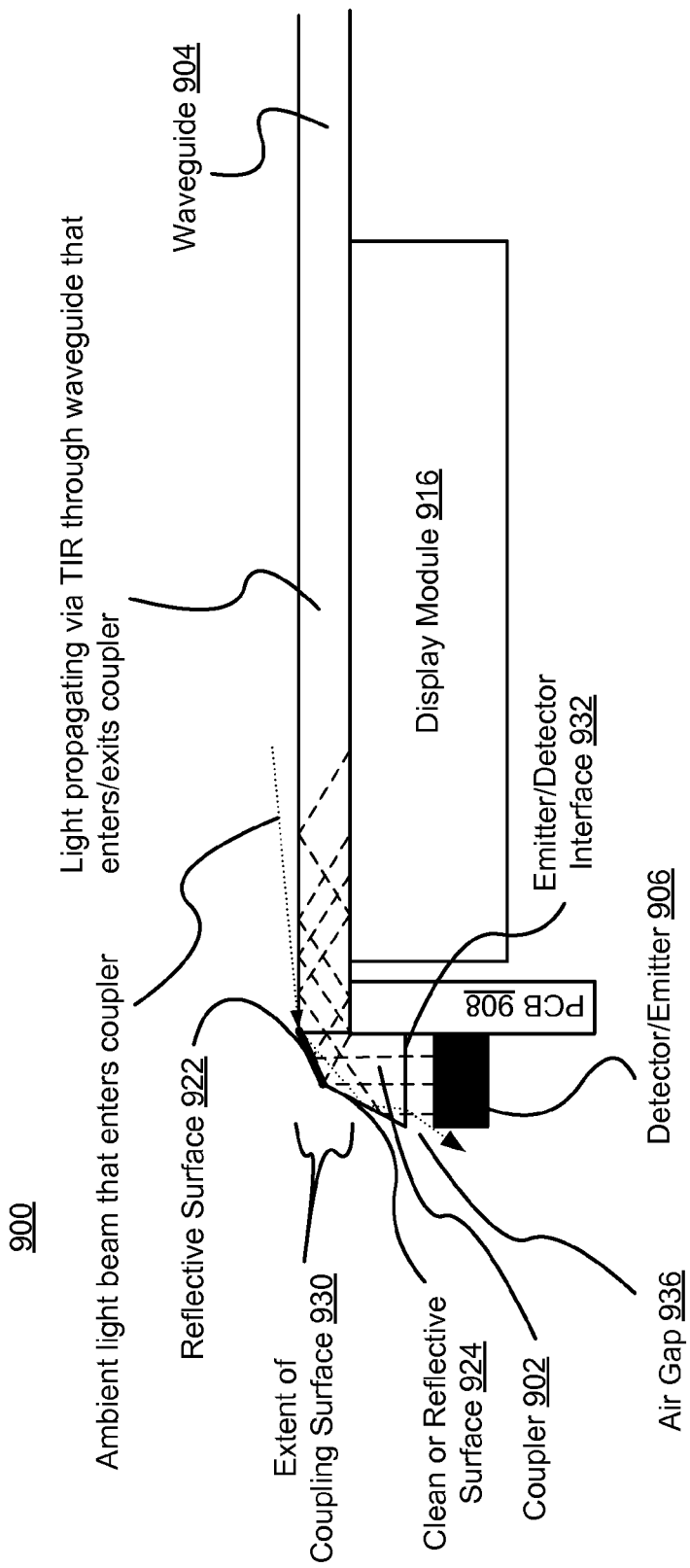
FIG. 9A
FIG. 9B

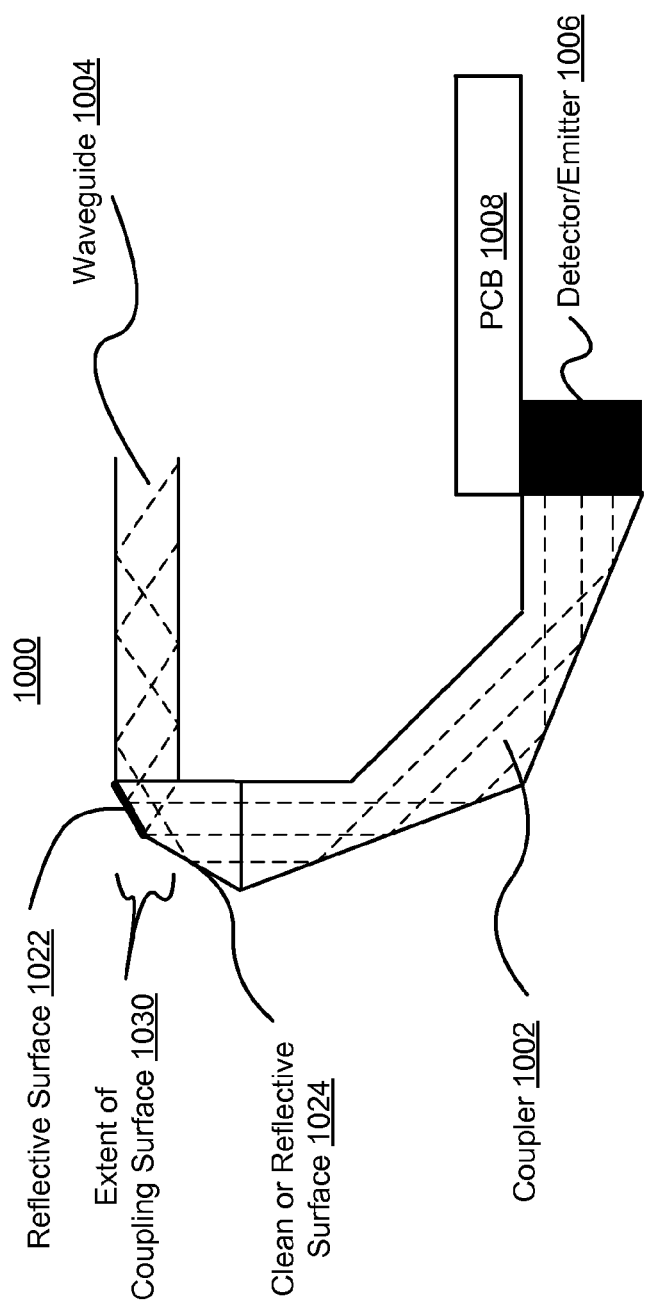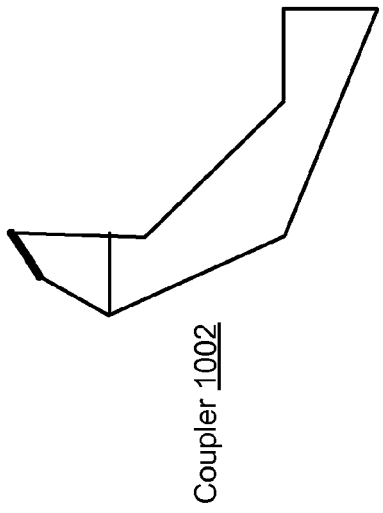
FIG. 10A
FIG. 10B

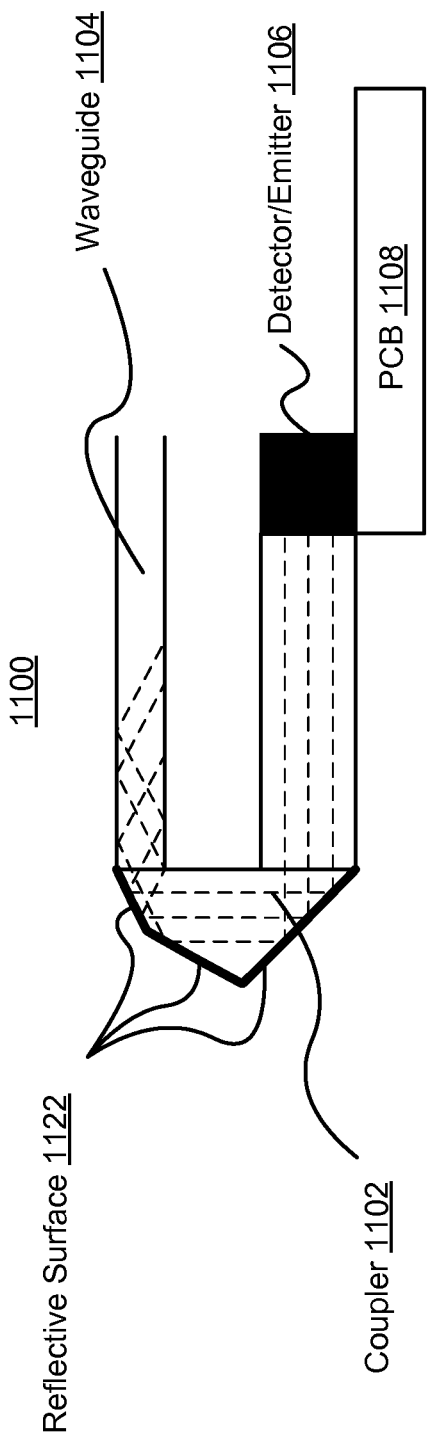
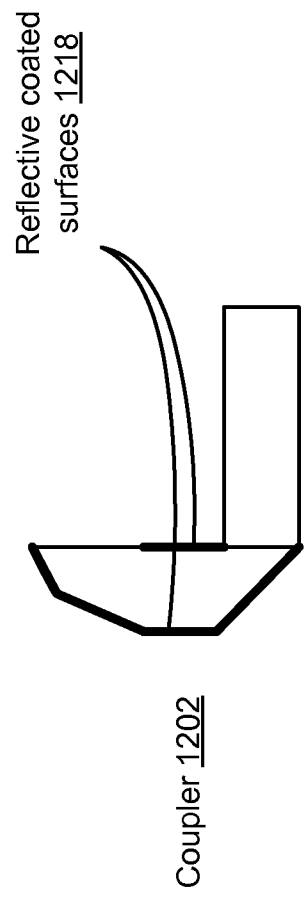
FIG. 11A
FIG. 11B
FIG. 12

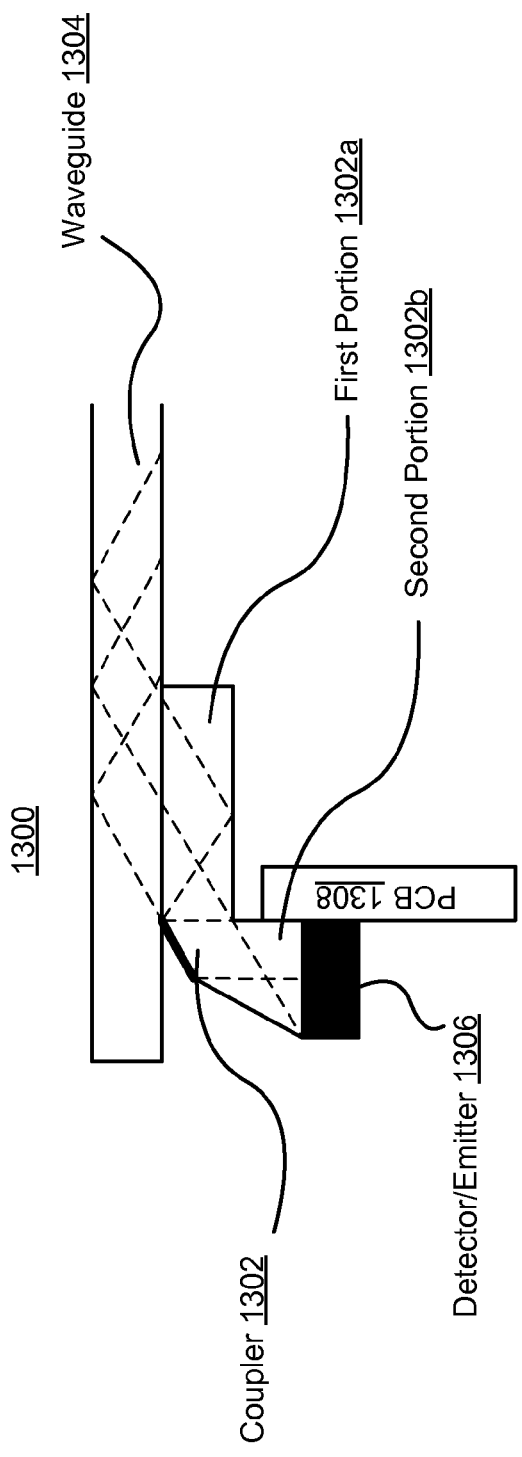
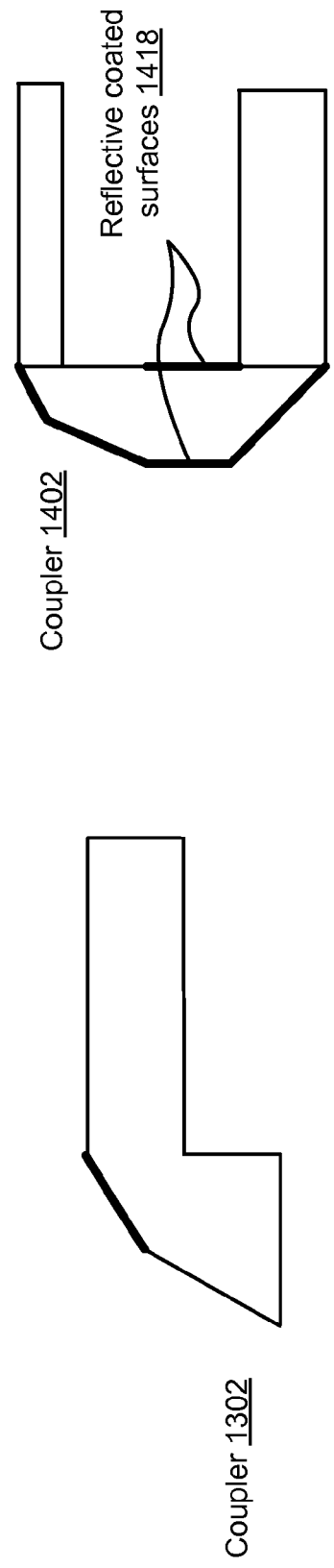
FIG. 13A
FIG. 13B
FIG. 14

OPTICAL COUPLER FOR USE IN AN OPTICAL TOUCH SENSITIVE DEVICE

CROSS REFERENCE TO RELATED APPLICATIONS

This application claims the benefit of U.S. Provisional Application No. 61/510,989, filed on Jul. 22, 2011, which is hereby incorporated by reference in its entirety.

BACKGROUND

1. Field of Art

This invention generally relates to optical couplers, especially optical couplers used in touch sensitive devices.

2. Description of the Related Art

Touch-sensitive displays for interacting with computing devices are becoming more common. A number of different technologies exist for implementing touch-sensitive displays and other touch-sensitive devices. Examples of these techniques include, for example, resistive touch screens, surface acoustic wave touch screens, capacitive touch screens and certain types of optical touch screens.

However, many of these approaches currently suffer from drawbacks. For example, some technologies may function well for small sized displays, as used in many modern mobile phones, but do not scale well to larger screen sizes as in displays used with laptop or even desktop computers. For technologies that require a specially processed surface or the use of special elements in the surface, increasing the screen size by a linear factor of N means that the special processing must be scaled to handle the $N^2$ larger area of the screen or that $N^2$ times as many special elements are required. This can result in unacceptably low yields or prohibitively high costs.

Another drawback for some technologies is their inability or difficulty in handling multitouch events. A multitouch event occurs when multiple touch events occur simultaneously. This can introduce ambiguities in the raw detected signals, which then must be resolved. Importantly, the ambiguities must be resolved in a speedy and computationally efficient manner. If too slow, then the technology will not be able to deliver the touch sampling rate required by the system. If too computationally intensive, then this will drive up the cost and power consumption of the technology.

Another drawback is that technologies may not be able to meet increasing resolution demands. Assume that the touch-sensitive surface is rectangular with length and width dimensions L×W. Further assume that an application requires that touch points be located with an accuracy of δl and δw, respectively. The effective required resolution is then R=(LW)/(δl δw). We will express R as the effective number of touch points. As technology progresses, the numerator in R generally will increase and the denominator generally will decrease, thus leading to an overall increasing trend for the required touch resolution R.

Thus, there is a need for improved touch-sensitive systems.

SUMMARY

An optical touch-sensitive device is able to determine the locations of multiple simultaneous touch events. The optical touch-sensitive device includes multiple emitters and detectors coupled with an optical coupler assembly through a waveguide on the surface on the optical-touch sensitive device. The coupler may be side coupled or edge coupled to the waveguide. For both the side coupled or edge coupled cases, the coupler may also be configured to reorient beams to accommodate any orientation of emitters and detectors with respect to the waveguide. The coupler may also be configured to translate beams laterally or vertically to accommodate any position of emitters and detectors. The coupler, and touch-sensitive device more generally, are also configured to prevent or reduce ambient light entering the waveguide from hitting the emitters and detectors. Each emitter produces optical beams which are received by the detectors. Touch events disturb the optical beams.

BRIEF DESCRIPTION OF DRAWINGS

Embodiments of the present invention will now be described, by way of example, with reference to the accompanying drawings, in which:

FIGS. 7A-7B are side views of an optical touch-sensitive device including a side coupled optical coupler assembly configured to redirect light into emitters and detectors are oriented perpendicular to the optical waveguide.

FIGS. 9A-9B are side views of an optical touch-sensitive device including an edge coupled optical coupler assembly.

FIGS. 10A-10B, 11A-B, and 12 are side views of various implementations of optical touch-sensitive device including edge coupled optical coupler assemblies configured to redirect light into emitters and directors oriented in a direction opposite to the optical waveguide.

FIGS. 13A-13B, 14 are side views of an optical touch-sensitive device including an optical coupler assembly that is side coupled to an optical waveguide, and that includes multiple portions that are edge coupled together.

DETAILED DESCRIPTION

I. Introduction

A. Device Overview

Figure 1:
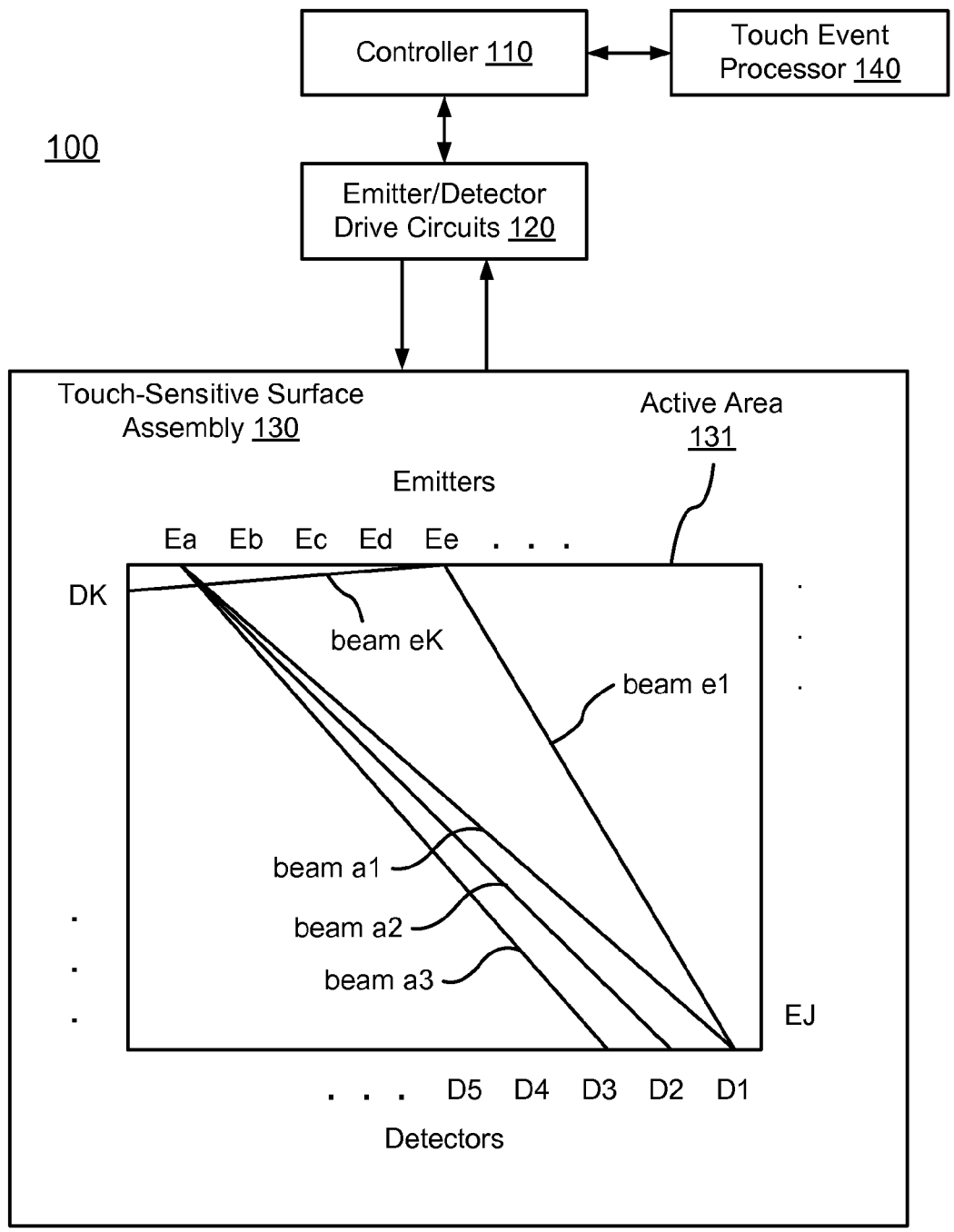
FIG. 1 is a diagram of an optical touch-sensitive device, according to one embodiment.

FIG. 1 is a diagram of an optical touch-sensitive device 100, according to one embodiment. The optical touch-sensitive device 100 includes a controller 110, emitter/detector drive circuits 120, and a touch-sensitive surface assembly 130. The surface assembly 130 includes an active area 131 over which touch events are to be detected. For convenience, the active area 131 may sometimes be referred to as the active surface or surface, as the active area itself may be an entirely passive structure such as an optical waveguide. The assembly 130 also includes emitters and detectors arranged along the periphery of the active area 131. In this example, there are J emitters labeled as Ea-EJ and K detectors labeled as D1-DK. The device also includes a touch event processor 140, which may be implemented as part of the controller 110 or separately as shown in FIG. 1. A standardized API may be used to communicate with the touch event processor 140, for example between the touch event processor 140 and controller 110, or between the touch event processor 140 and other devices connected to the touch event processor.

The emitter/detector drive circuits 120 serve as an interface between the controller 110 and the emitters Ej and detectors Dk. The emitters produce optical "beams" which are received by the detectors. Preferably, the light produced by one emitter is received by more than one detector, and each detector receives light from more than one emitter. For convenience, "beam" will refer to the light from one emitter to one detector, even though it may be part of a large fan of light that goes to many detectors rather than a separate beam. The beam from emitter Ej to detector Dk will be referred to as beam jk. FIG. 1 expressly labels beams a1, a2, a3, e1 and eK as examples. Touches within the active area 131 will disturb certain beams, thus changing what is received at the detectors Dk. Data about these changes is communicated to the touch event processor 140, which analyzes the data to determine the location(s) (and times) of touch events on surface 131.

B. Process Overview

Figure 2:
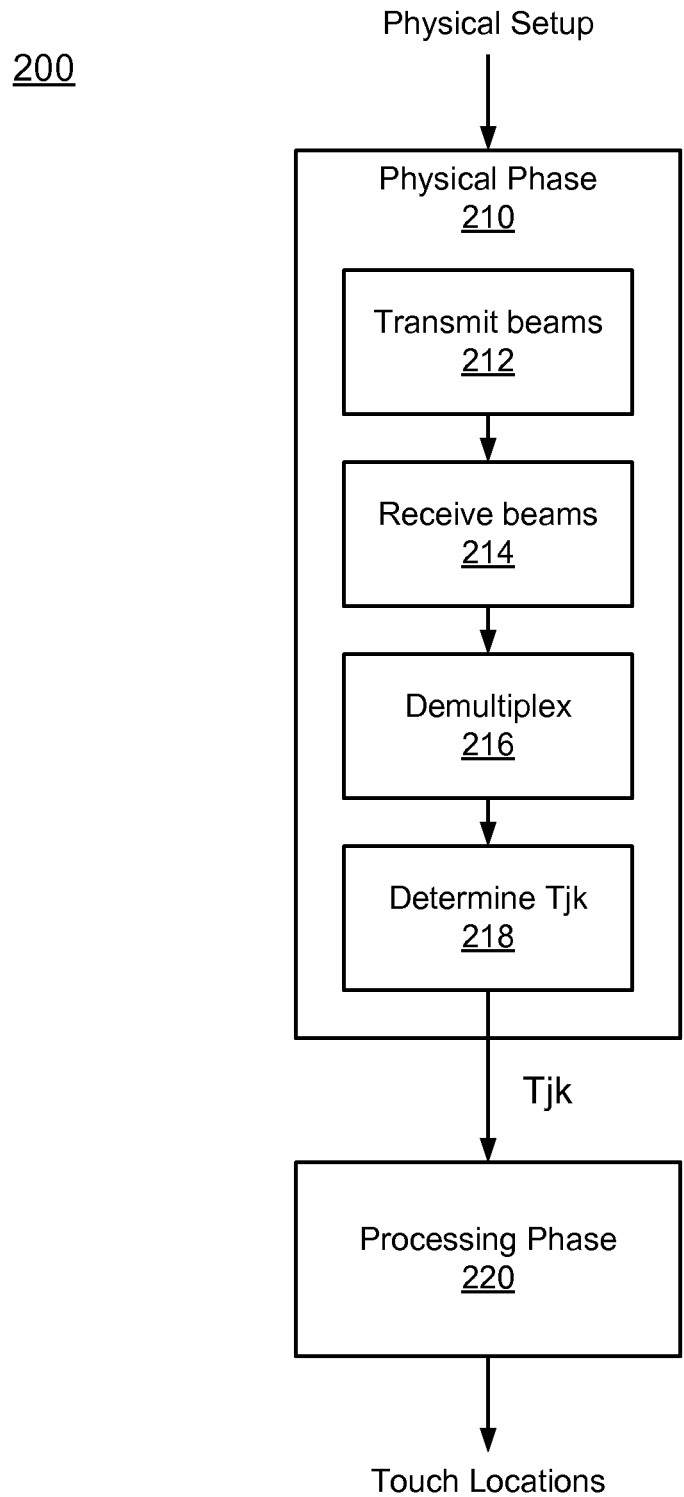
FIG. 2 is a flow diagram for determining the locations of touch events, according to one embodiment.

FIG. 2 is a flow diagram for determining the locations of touch events, according to one embodiment. This process will be illustrated using the device of FIG. 1. The process 200 is roughly divided into two phases, which will be referred to as a physical phase 210 and a processing phase 220. Conceptually, the dividing line between the two phases is a set of transmission coefficients Tjk.

The transmission coefficient Tjk is the transmittance of the optical beam from emitter j to detector k, compared to what would have been transmitted if there was no touch event interacting with the optical beam.

The use of this specific measure is purely an example. Other measures can be used. In particular, since we are most interested in interrupted beams, an inverse measure such as (1−Tjk) may be used since it is normally 0. Other examples include measures of absorption, attenuation, reflection or scattering. In addition, although FIG. 2 is explained using Tjk as the dividing line between the physical phase 210 and the processing phase 220, it is not required that Tjk be expressly calculated. Nor is a clear division between the physical phase 210 and processing phase 220 required.

Returning to FIG. 2, the physical phase 210 is the process of determining the Tjk from the physical setup. The processing phase 220 determines the touch events from the Tjk. The model shown in FIG. 2 is conceptually useful because it somewhat separates the physical setup and underlying physical mechanisms from the subsequent processing.

For example, the physical phase 210 produces transmission coefficients Tjk. Many different physical designs for the touch-sensitive surface assembly 130 are possible, and different design tradeoffs will be considered depending on the end application. For example, the emitters and detectors may be narrower or wider, narrower angle or wider angle, various wavelengths, various powers, coherent or not, etc. As another example, different types of multiplexing may be used to allow beams from multiple emitters to be received by each detector.

The interior of block 210 shows one possible implementation of process 210. In this example, emitters transmit 212 beams to multiple detectors. Some of the beams travelling across the touch-sensitive surface are disturbed by touch events. The detectors receive 214 the beams from the emitters in a multiplexed optical form. The received beams are de-multiplexed 216 to distinguish individual beams jk from each other. Transmission coefficients Tjk for each individual beam jk are then determined 218.

The processing phase 220 can also be implemented in many different ways. Candidate touch points, line imaging, location interpolation, touch event templates and multi-pass approaches are all examples of techniques that may be used as part of the processing phase 220.

II. Physical Set-Up

The touch-sensitive device 100 may be implemented in a number of different ways. The following are some examples of design variations.

A. Electronics

With respect to electronic aspects, note that FIG. 1 is exemplary and functional in nature. Functions from different boxes in FIG. 1 can be implemented together in the same component.

B. Touch Interactions

Figure 3A:
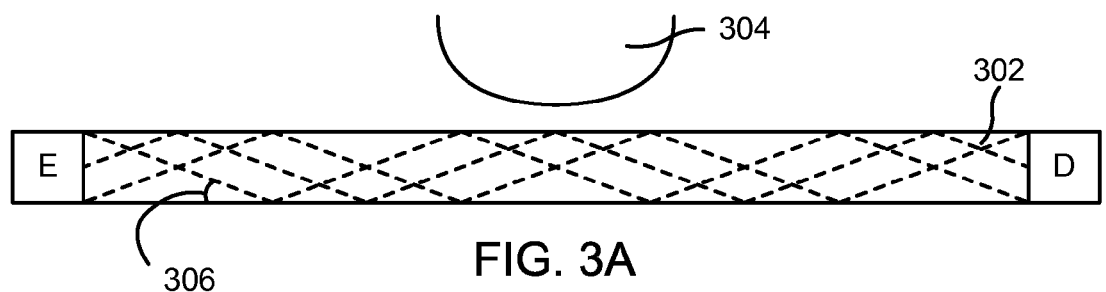
FIGS. 3A-3B illustrate a frustrated TIR mechanism for a touch interaction with an optical beam.
Figure 3B:
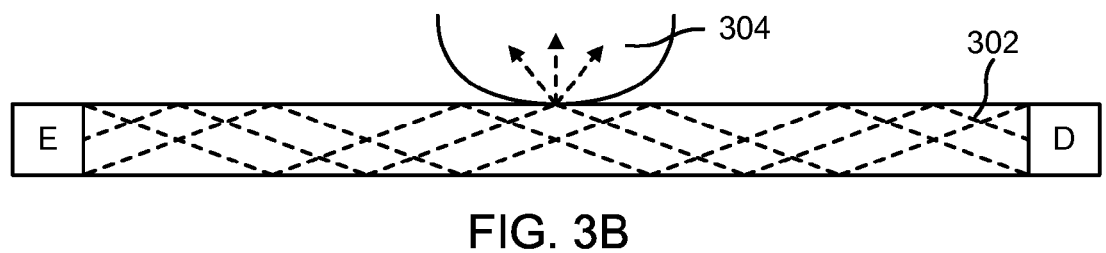

Different mechanisms for a touch interaction with an optical beam can be used. One example is frustrated total internal reflection (TIR). In frustrated TIR, an optical beam is confined to an optical waveguide by total internal reflection and the touch interaction disturbs the total internal reflection in some manner. FIGS. 3A-3B illustrate a frustrated TIR mechanism for a touch interaction with an optical beam.

The touch interactions can also be direct or indirect. In a direct interaction, the touching object (e.g., a finger or stylus) is the object that interacts with the optical beam. For example, a finger may have a higher index of refraction than air, thus frustrating TIR when the finger comes into direct contact with a waveguide. In an indirect interaction, the touching object interacts with an intermediate object, which interacts with the optical beam. For example, the finger may cause a high index object to come into contact with the waveguide, or may cause a change in the index of refraction of the waveguide or surrounding materials.

Figure 3C:
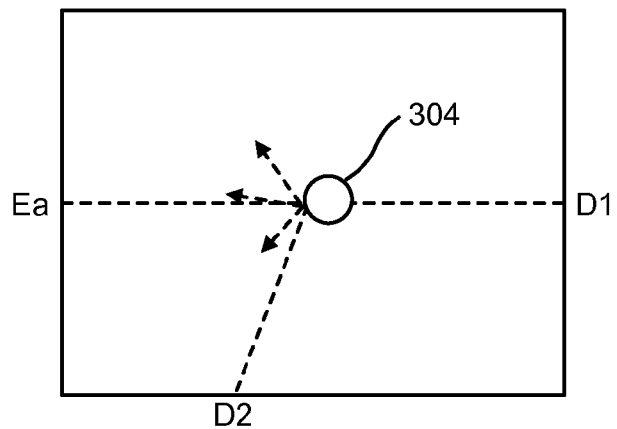
FIG. 3C illustrates a touch interaction with an optical beam enhancing transmission.

Note that some types of touch interactions can be used to measure contact pressure or touch velocity, in addition to the presence of touches. Also note that some touch mechanisms may enhance transmission, instead of or in addition to reducing transmission. FIG. 3C illustrates a touch interaction with an optical beam enhancing transmission. For simplicity, in the remainder of this description, the touch mechanism will be assumed to be primarily of a blocking nature, meaning that a beam from an emitter to a detector will be partially or fully blocked by an intervening touch event. This is not required, but it is convenient to illustrate various concepts.

For convenience, the touch interaction mechanism may sometimes be classified as either binary or analog. A binary interaction is one that basically has two possible responses as a function of the touch. Examples includes non-blocking and fully blocking, or non-blocking and 10%+attenuation, or not frustrated and frustrated TIR. An analog interaction is one that has a "grayscale" response to the touch: non-blocking passing through gradations of partially blocking to blocking.

C. Emitters, Detectors and Couplers

Each emitter transmits light to a number of detectors. Usually, each emitter outputs light to more than one detector simultaneously. Similarly, each detector receives light from a number of different emitters. The optical beams may be visible, infrared and/or ultraviolet light. The term "light" is meant to include all of these wavelengths and terms such as "optical" are to be interpreted accordingly.

Examples of the optical sources for the emitters include light emitting diodes (LEDs) and semiconductor lasers. IR sources can also be used. Modulation of the optical beams can be external or internal. Examples of sensor elements for the detector include charge coupled devices, photodiodes, photoresistors, phototransistors, and nonlinear all-optical detectors.

The emitters and detectors may also include optics and/or electronics in addition to the main optical source, sensor element. For example, emitters and detectors may incorporate or be attached to lenses to spread and/or collimate emitted or incident light. Additionally, one or more optical coupling assemblies (couplers) of varying design can be used to couple the emitters and detectors to the waveguide. The waveguide, coupler, and any intervening optical elements all have a similar refractive index that is higher than that of air to facilitate TIR throughout the entire optical path of each beam. These elements may be physically coupled together using a bonding agent that has a similar refractive index to the waveguide and coupler. Alternatively, at various points along the optical path air gaps may be present between elements in place of a bonding agent.

D. Optical Beam Paths

Figure 4A:
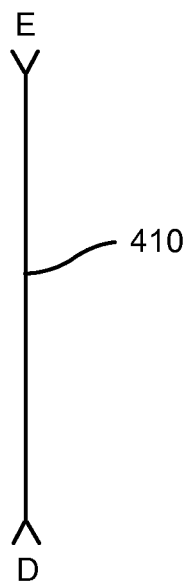
FIGS. 4A-4C are top views of differently shaped beam footprints.
Figure 4B:
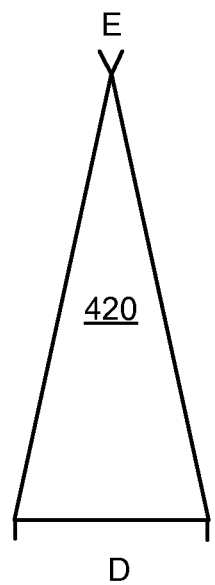
Figure 4C:
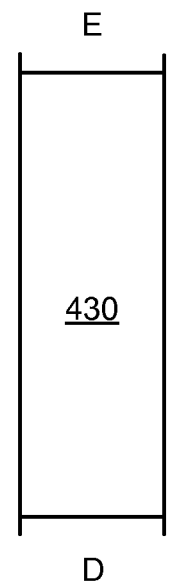

FIGS. 4A-4C are top or side views of differently shaped beam footprints. Another aspect of a touch-sensitive system is the shape and location of the optical beams and beam paths. In FIGS. 1-2, the optical beams are shown as lines. These lines should be interpreted as representative of the beams, but the beams themselves may be different shapes and footprints. A point emitter and point detector produce a narrow "pencil" beam with a line-like footprint. A point emitter and wide detector (or vice versa) produces a fan-shaped beam with a triangular footprint. A wide emitter and wide detector produces a "rectangular" beam with a rectangular footprint of fairly constant width. Depending on the width of the footprint, the transmission coefficient Tjk behaves as a binary or as an analog quantity. It is binary if the transmission coefficient transitions fairly abruptly from one extreme value to the other extreme value as a touch point passes through the beam. For example, if the beam is very narrow, it will either be fully block or fully unblocked. If the beam is wide, it may be partially blocked as the touch point passes through the beam, leading to a more analog behavior.

Beams may have footprints in both the lateral (horizontal) direction, as well as in the vertical direction. The lateral footprint of a beam may be the same or different from the horizontal footprint of a beam.

The direction and spread of the light emitted from the emitters and received by the detectors may vary in spread or angle from beam footprints intended to cover the active area 131. To shape the beams to achieve the intended footprints, lenses may be attached to the emitters and detectors. For example, point emitters and detectors may be used in conjunction with lenses to spread beams in the horizontal or vertical directions.

Figure 5A:
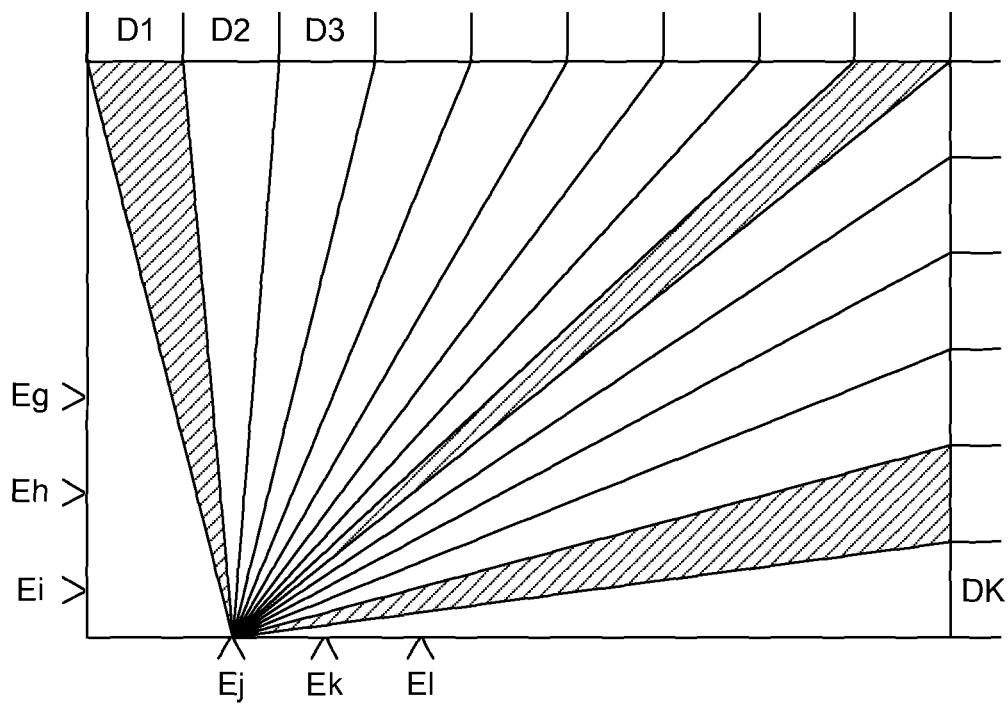
FIGS. 5A-5B are top views illustrating active area coverage by emitters and detectors.
Figure 5B:
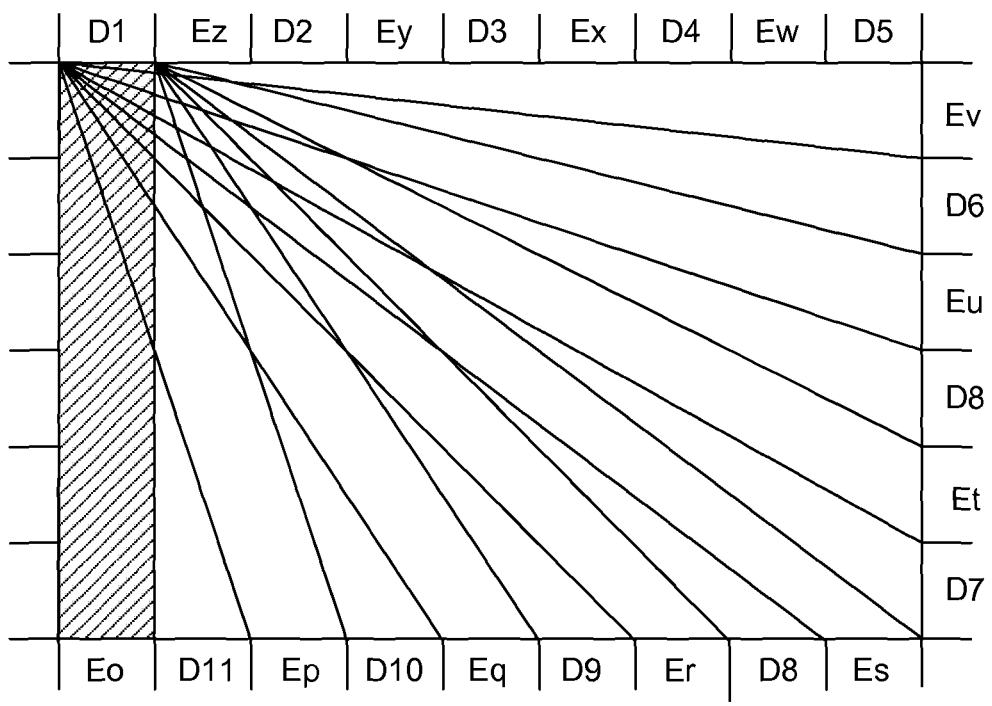

FIGS. 5A-5B are top views illustrating active area coverage by emitters and detectors. As above, the emitters and detectors are arranged along the periphery of the active area. All the emitters may be arranged on two sides of the active area, for example two adjacent perpendicular sides as illustrated in FIG. 5A. Similarly, all of detectors may be arranged on the other two sides of the active area. Alternatively, the emitters and detectors may be mixed or interleaved according to a pattern as illustrated in FIG. 5B. This pattern may be one emitter in between each detector, or another more complicated arrangement.

In most implementations, each emitter and each detector will support multiple beam paths, although there may not be a beam from each emitter to every detector. The aggregate of the footprints from all beams from one emitter will be referred to as that emitter's coverage area. The coverage areas for all emitters can be aggregated to obtain the overall coverage for the system.

The footprints of individual beams can be described using different quantities: spatial extent (i.e., width), angular extent (i.e., radiant angle for emitters, acceptance angle for detectors) and footprint shape. An individual beam path from one emitter to one detector can be described by the emitter's width, the detector's width and/or the angles and shape defining the beam path between the two. An emitter's coverage area can be described by the emitter's width, the aggregate width of the relevant detectors and/or the angles and shape defining the aggregate of the beam paths from the emitter. Note that the individual footprints may overlap. The ratio of (the sum of an emitter's footprints)/(emitter's cover area) is one measure of the amount of overlap.

The overall coverage area for all emitters should cover the entirety of the active area 131. However, not all points within the active area 131 will be covered equally. Some points may be traversed by many beam paths while other points traversed by far fewer. The distribution of beam paths over the active area 131 may be characterized by calculating how many beam paths traverse different (x,y) points within the active area. The orientation of beam paths is another aspect of the distribution. An (x,y) point that is derived from three beam paths that are all running roughly in the same direction usually will be a weaker distribution than a point that is traversed by three beam paths that all run at 60 degree angles to each other.

The concepts described above for emitters also apply to detectors. A detector's coverage area is the aggregate of all footprints for beams received by the detector.

III. Optical Coupler Assemblies and Related Hardware

A. General Description

As introduced above, the optical touch-sensitive device 100 includes a planar optical waveguide that is optically coupled to the emitters and detectors with an optical coupler assembly (or coupler). The optical touch-sensitive device may also include any one or more of a printed circuit board (PCB), an ambient light shield, an IR transmissive layer, one or more air gaps and associated ambient light absorbing surfaces, and a display module.

The waveguide extends past the lateral edge of a display module. The waveguide may be constructed of a material that is rigid or flexible. Regardless of the type of material used to construct the waveguide, the waveguide has a top surface that is substantially or exactly parallel to its bottom surface. The top surface of the waveguide is oriented to receive touch input. The bottom surface of the waveguide is optically coupled to the coupler outside the lateral extent of the display module. As described above, optical beams travel through the waveguide using TIR. That is, optical beams reflect off of the top and bottom surfaces of the waveguide at angles greater than a critical angle from the normal to the top and bottom surfaces of the waveguide. Touch events, detected using frustrated TIR, are received within an active area 131 of the top surface of the waveguide.

The coupler may be side coupled or edge coupled to the waveguide. For both the side coupled or edge coupled cases, the coupler may also be configured to reorient beams to accommodate any orientation of emitters and detectors with respect to the waveguide. The coupler may also be configured to translate beams laterally or vertically to accommodate any position of emitters and detectors. The coupler, and touch-sensitive device more generally, are also configured to prevent or reduce ambient light entering the waveguide from hitting the emitters and detectors.

The coupler may be formed with a single piece of material, or with several optically coupled pieces. Each emitter and detector may have its own coupler to couple light into and out of the waveguide. Alternatively, emitters and/or detectors may share a coupler. The coupler may be made with any number of materials including, for example, glass or plastic.

The emitters and detectors are arranged beneath the bottom surface of the waveguide along the periphery of the display module. Positioning the emitters and detectors along the periphery of the display module includes positioning the emitters and detectors outside the outer side edge of the display module 616, so that the emitters and detectors are to the side, laterally, around the display module. Positioning the emitters and detectors along the periphery of the display module also includes positioning the emitters and detectors underneath the bottom side of the display module 616 near the side edge of the display module. The emitters and detectors are electrically coupled to the PCB which may include or electrically couple to the emitter/detector drive circuits 120.

The optical touch-sensitive device is configured to operate in conjunction with a display (or screen) module configured to display images, however the display module is not necessarily part of the optical touch sensitive device. The display module is illustrated for clarity. The drawings of the device in FIGS. 6-14 are not to scale in order to highlight aspects of the coupler design, and it is expected that the display module and active area will in practice be much larger than the coupler and related hardware.

B. Side Coupled Optical Couplers

Figure 6A:
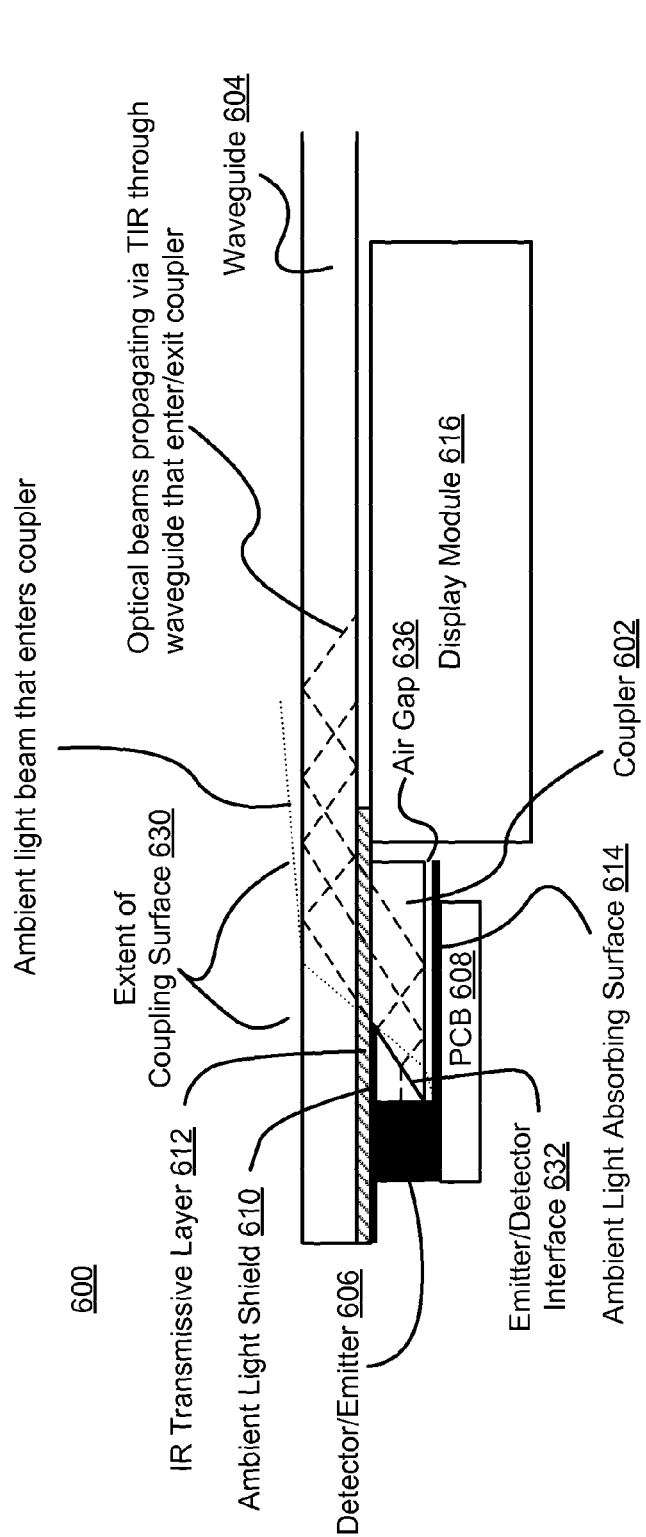
FIGS. 6A-6B are side views of an optical touch-sensitive device including a side coupled optical coupler assembly.
Figure 6B:
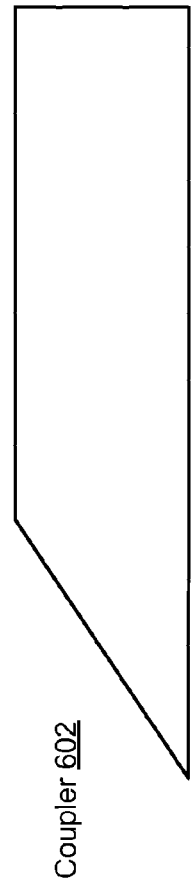

FIGS. 6A-6B are side views of an optical touch-sensitive device 600 including a side coupled optical coupler assembly 602. In device 600, the detectors and emitters 606 are oriented to receive and emit light, respectively, in a direction parallel to the top and bottom surfaces of the waveguide 604, such that light exits the emitters and enters the detectors in substantially the same lateral direction it travels laterally through the waveguide 604.

1. Coupler Structure and Beam Transmission through the Coupler

The coupler 602 is side coupled to the bottom surface of the waveguide 604. Generally, the side coupling consists of a single planar coupling surface 630 on the top surface of the coupler 602 that is optically coupled, directly or indirectly, to the bottom surface of the waveguide 604. Although as illustrated the coupling surface 630 is the entirety of one surface of the coupler 602, this need not be the case.

Regarding beam transmission through the coupler 602, consider the case of beams entering detector 606. Close to the coupling surface 630, beams reflect, via TIR, off the top surface of the waveguide 604 and enter the coupler 602 through the coupling surface 630. The beams reflect, again via TIR, off the bottom surface of the coupler 602 towards the detector 606. The bottom surface of the coupler 602 is optically parallel to the top surface of the coupler (including the coupling surface 630), and thus is also parallel to the top and bottom surfaces of the waveguide 604. Depending upon the construction of the coupler 602, the optical beams may reflect one or more additional times via TIR within the optical coupler 602 before exiting the coupler 602 and entering the detector 606. This may occur, for example, if there is a substantial lateral distance between the coupling surface 630 and the detector 606.

The optical beams exit the coupler 602 towards the detector 606 through a emitter/detector (E/D) interface 632. The beams then pass through an air gap 636, before entering the detector. In alternate implementations, there is no air gap and the emitters/detectors 606 are directly bonded or otherwise affixed to the E/D interface 632. The optical beams exiting the emitter 606 will traverse the reverse path through the coupler 602 into the waveguide 604 to those beams entering the detector 606 as described above Generally, the E/D interface 632 is angled with respect to the coupling surface 630 and/or any other intervening surfaces within the coupler that reflect beams. The angle of the E/D interface 632 is configured so as to reorient the beams from the angle at which they will TIR from the top and bottom surfaces of the waveguide 604 to the angle at which they will enter and exit the emitters and detectors 606, respectively. In the example of FIG. 6A, the E/D interface 632 is angled at a nonzero angle with respect to the top and bottom surfaces of the coupler 602. In other implementations an E/D interface 632 that is parallel or perpendicular to the coupling surface 630 may be used in place of an angled one. For beams to enter/exit the detectors/emitters 606 in such a construction, the beams reflect off of at least one other surface of the coupler that is at an angle with respect to the E/D interface 632.

The dashed lines in FIG. 6A and subsequent figures illustrate example optical rays entering/exiting a detector/emitter 606 from different points along the detector's/emitter's vertical extent. These rays are traced through the coupler 602 and waveguide 604 to illustrate the path taken by beams through the optical touch-sensitive device 600 as explained above. These rays represented idealized collimated beams, in reality optical beams will spread several degrees in both the horizontal and vertical directions. This beam spreading is useful and can be relied upon to increase the coverage of the active area 131 by optical beams.

FIG. 6B illustrates the coupler 602 in isolation from the remainder of the device 600.

2. Ambient Light Prevention/Rejection

The optical touch-sensitive device 600 may include several different mechanisms for preventing ambient light from entering the emitters and detectors 606. One such mechanism is air gaps next to surfaces of the optical coupler, with or without additional ambient light absorbing surfaces located near to those surfaces. An example is air gap 636 near the bottom surface of the coupler 602, with ambient light absorbing surface 614 positioned nearby.

Generally, if ambient light is incident on an internal surface of the coupler at an angle less than the critical angle with respect to the normal to that surface, the ambient light will couple out of the coupler through that surface. For most ambient light hitting the waveguide, this takes the form of ambient light entering the coupler through the coupling surface at an angle less than the critical angle with respect to the normal of the top of and bottom surfaces of the waveguide. In coupler 602, this ambient light couples out of the coupler 602 through the bottom surface of the coupler 602. This ambient light then passes through air gap 636 and is absorbed by ambient light absorbing surface 614. However, this principle is generally applicable to any light incident on any surface of the coupler.

In FIG. 6, the dotted light represents ambient light that enters the coupler 602 that comes close to hitting an emitter/detector 606. Although illustrated as incoming at a not-insignificant angle with respect to the top surface of the waveguide 604, the angle of incidence of the light coming close to the emitter/detector 606 is in reality vanishingly small.

Another such mechanism is ambient light shield 610. This shield 610 is optically interposed between the waveguide 604 and the coupler 602, as well as between the emitters/detectors 606. The light shield 610 extends laterally to the edge of the coupling surface 630 of the coupler 602, and may in practice be used to at least partially determine the surface area of the coupling surface 630. The shield 610 prevents ambient light entering the waveguide 604 at an angle less than the critical angle close to the emitters/detectors 606 from hitting the emitters/detectors 606. This includes ambient light entering the waveguide 604 closer, laterally, to the emitters/detectors 606 than the start of the E/D interface 632. The light shield may stop short of the waveguide edge if the waveguide extends beyond the point where additional light shielding is of little or no benefit.

Another such mechanism is an IR transmissive layer 612 which blocks light in the visible wavelength range while allowing light in the infrared range to pass. The IR transmissive layer 612 is optically interposed between the coupler 602 and the bottom surface of the waveguide 604, and covers the coupling surface 630. The IR transmissive layer 612 may or may not affect the performance of the detectors and emitters 602, depending upon the operational wavelength range of the those components. The IR transmissive layer 612 also serves an aesthetic function, causing the components of the device 600 below the waveguide 604 to be hidden from view due to its opaqueness. The exact lateral extent of the IR transmissive layer 612 over the active area and/or display 616 may vary, depending upon the implementation.

3. Individual and Shared Couplers

Figure 6C:
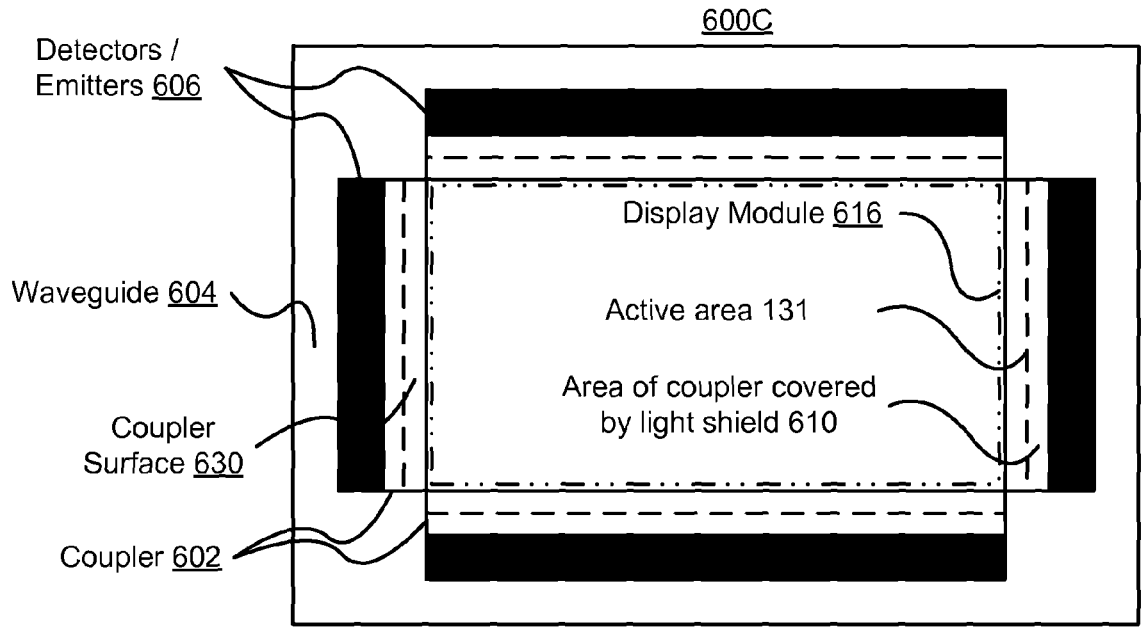
FIGS. 6C-6D are top views of an optical touch-sensitive device including a side coupled optical coupler assembly.
Figure 6D:
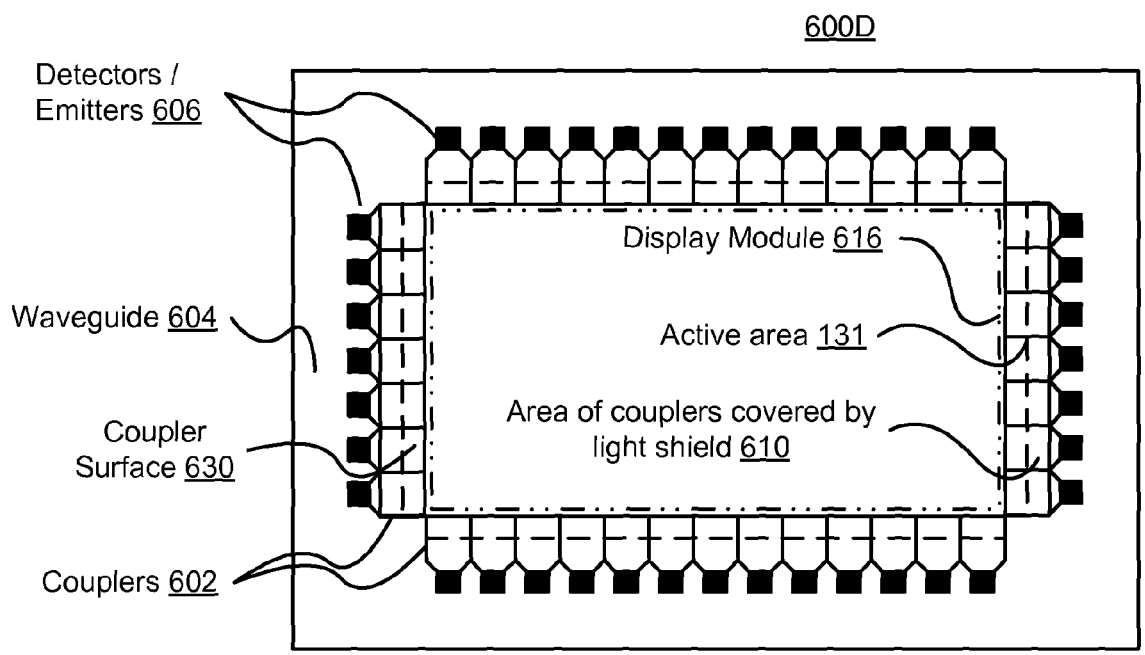

FIGS. 6C-6D are top views of an optical touch-sensitive device including a side coupled optical coupler assembly. The top view illustrates the relative lateral extents of the waveguide 604, display module 616, and active area 131. As explained above, in this example, the waveguide 604 extends laterally past and covering the display module 616, couplers 602 including the coupling surface 630, and emitters detectors 606. From top down, a portion of the coupler is the coupler surface 630, another portion is covered by light shield 610.

FIG. 6C illustrates an implementation where relatively few couplers 602 (in this case four) are each shared between a number of emitters and/or detectors 606. FIG. 6D illustrates an implementation where each emitter and detector 606 has its own coupler 602. In another implementation, a single coupler may be shared between all emitters and detectors (not shown).

4. Beam Rotation within the Coupler

FIGS. 7A-7B are side views of an optical touch-sensitive device 700 including a side coupled optical coupler assembly, where the coupler 702 is configured to redirect beams between emitters/detectors 706 oriented perpendicular to the top and bottom surfaces of the waveguide 704. In coupler 702, this is achieved by configuring the E/D interface 732 of the coupler 702 to be parallel to the coupling surface 730, and perpendicular to the lateral direction of travel of optical beams through the waveguide 704. That is, beams travelling through the waveguide 704 are rotated approximately 90 degrees when entering/exiting the detectors/emitters 706.

At least one other surface of the coupler 702 is arranged at a nonzero angle with respect to the E/D interface 732 so as to reflect, via TIR, the beams entering the coupler 702 through the coupling surface 730 towards the E/D interface 732. The result of this configuration is that the beams that were traveling laterally through the waveguide 704 are reflected off of an angled surface of the coupler 702 to travel vertically through the E/D interface 732.

Although FIG. 7A illustrates the E/D interface 732 as parallel to the coupling surface 730, other implementations using a non-parallel E/D interface 732 are also envisioned for achieving 90 degree rotation of the beams. Generally, the angle through which beams are rotated is a function of the angle of the E/D interface 732 with respect to the coupling surface 730, and the angles of any intervening surfaces within the coupler 730 that the beams will bounce off of.

With respect to ambient light rejection/prevention, FIG. 7A illustrates an IR transmissive layer 712 that functions similarly to IR transmissive layer 612. FIG. 7A also illustrates ambient light that comes close to impinging on the emitters/detectors 606. Some of the ambient light entering the waveguide 704 at less than the critical angle exits the coupler 702 through the E/D interface 732. This ambient light refracts within the air gap 736 between the E/D interface 732 and the detector/emitter 706. Due to this refraction, the ambient light is prevented from hitting the detector/emitter 706. Although not shown for clarity, device 700 may also incorporate additional air gaps, and ambient light absorbing surfaces.

FIG. 7B illustrates coupler 702 in isolation from the remainder of the device 700.

5. Specular Reflection and Light Pipes

Figure 8A:
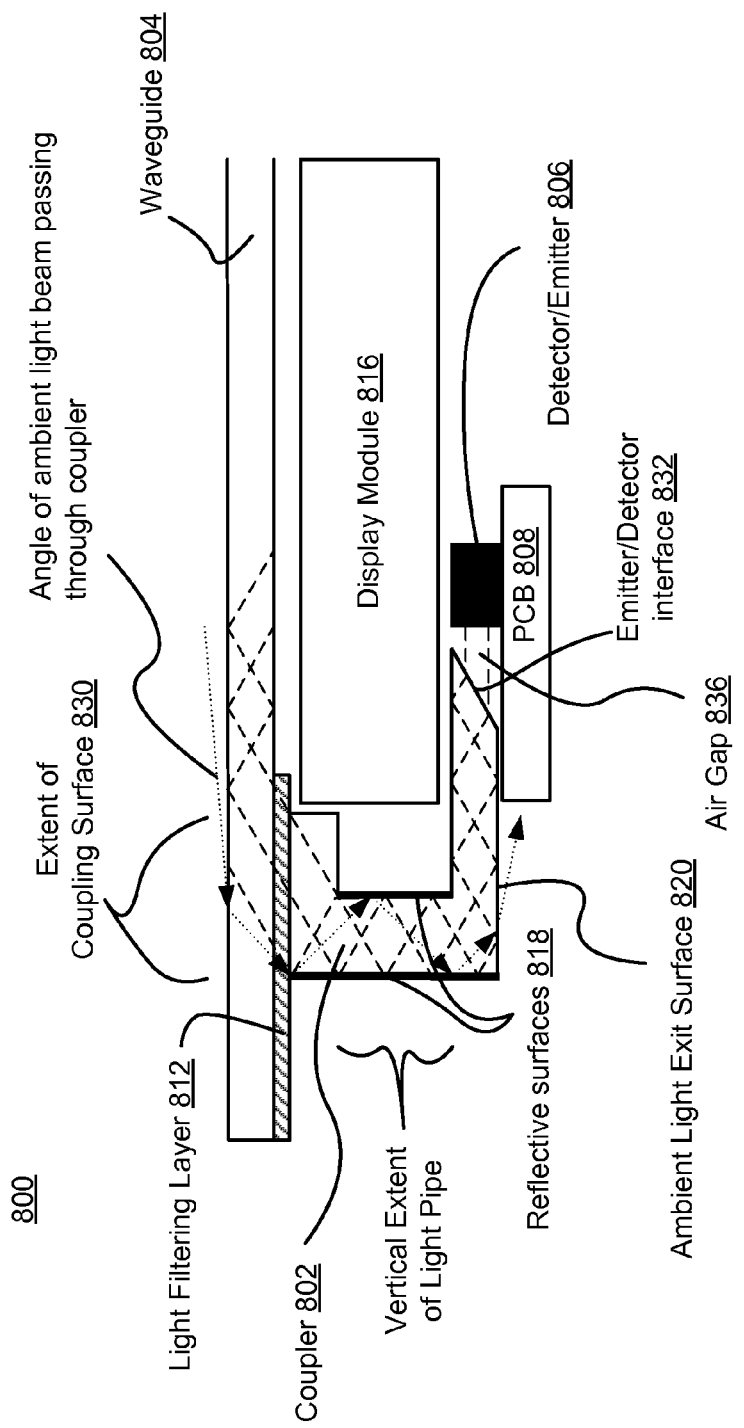
FIGS. 8A-8B are side views of an optical touch-sensitive device including a side coupled optical coupler assembly configured to redirect light through a vertical light pipe into emitters and directors oriented in a direction opposite to the optical waveguide.
Figure 8B:
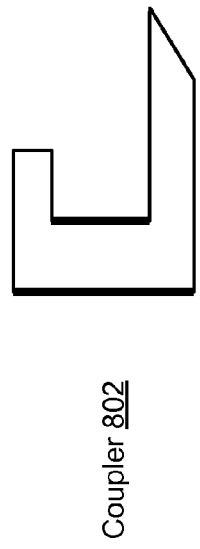

FIGS. 8A-8B are side views of an optical touch-sensitive device including a side coupled optical coupler assembly configured to redirect light through a vertical light pipe into emitters and directors oriented in a direction opposite to the optical waveguide. Although illustrated as reversing the beams once, in other implementations the light may be reversed in direction more than once.

Redirection of beams so that they travel in a direction opposite to their direction of lateral travel is accomplished in the same general manner as any other angle as described previously. A beam rotation of 180 degrees may be accomplished using only TIR by using more than one surface of the coupler. Alternatively this may also be accomplished, as illustrated in coupler 802, by coating at least one surface 818 of the coupler with a reflective (or mirroring or silvering) coating. Beams incident on the reflective surface 818 will specularly reflect. Using a reflective surface and specular reflection provide more flexibility in coupler design. For example, reflective surfaces may allow for significant space savings versus an equivalent, fully TIR coupler structure.

Again using the example of beams traveling towards detector 806, beams enter the coupler 802 through the coupling surface 830 and are specularly reflected by a reflective surface 818 of the coupler 802 perpendicular to the coupling surface 830. After one or more additional reflections off additional reflective surfaces 818, the beams reflect via TIR off of two additional coupler surfaces that are parallel to the coupling surface 830. The beams then pass through E/D interface 832 and enter detector 806. Again, beams exiting an emitter 806 travel a reverse path through the coupler 802.

Coupler 802 also includes a light pipe (not explicitly labeled) for vertically translating the beams with comparatively little loss and no change in beam angle. In coupler 802, the light pipe is constructed of two or more parallel reflecting surfaces 818. Light specularly reflects off of the reflective surfaces 818 in a particular direction of travel. Although illustrated in the vertical direction, the coupler may also include a horizontal light pipe (not shown). Light pipes are useful because they allow for compact coupler designs where the emitters and detectors are located remotely from the coupling surface 830. For example, as illustrated in FIG. 8, the light pipe allows the emitters and detectors to be tucked underneath the outer edge display module 816.

In implementations where the emitters and detectors 806 are located beneath the display module 816 as illustrated in FIG. 8A, constructing the coupler 802 two or more separable pieces facilitates easy construction of the device 800. For example, constructing the coupler 802 using two or more pieces may provide for easy insertion and removal of the display module 816. The boundary between two pieces of the coupler 802 could, for example, be located between the horizontal and vertical extents of the light pipe.

With respect to ambient light rejection, device 800 similarly includes a light filtering layer 812. Although not shown for clarity, device 800 may also incorporate one or more light shields, gaps, and light absorbing layers. The dotted light represents ambient light that enters the coupler 802. In this case, ambient light travels through the light pipe and exits through the bottom surface of the coupler 802.

FIG. 8B illustrates the coupler 802 in isolation from the remainder of the device 800.

C. Edge Coupled Optical Couplers

FIGS. 9A-9B are side views of an optical touch-sensitive device 900 including an edge coupled optical coupler assembly 902. In coupler 902, the detectors and emitters 906 are oriented to receive and emit light, respectively, in a direction perpendicular to the top and bottom surfaces of the waveguide 904, such that light exits the emitter in a direction rotated by ninety degrees with respect to the direction it travels laterally through the waveguide 904.

1. Coupler Structure and Beam Transmission through the Coupler

The coupler 902 is edge coupled to a side edge surface of the waveguide 904. Generally, the edge coupling consists of a single planar coupling surface 930 on a side edge surface of the coupler 902 that is optically coupled, directly or indirectly, to the side edge of the waveguide 904.

Regarding beam transmission through the coupler 902, consider the case of beams entering detector 906. Coupler 902 includes two surfaces angled at nonzero angles with respect to the coupling surface 930, and at nonzero angles with respect to each other, in order to redirect beams towards the detectors 906. The two surfaces are joined at a point, vertically, in between the top and bottom surface of the waveguide 904. Thus, beams incident from the waveguide 904 will reflect differently from the two surfaces.

The first surface 922 (or facet) is coated with a reflective material. The subset of all beams incident on the reflective surface 922 are redirected via specular reflection towards the detector 906. The second surface may or may not be coated with reflective material 924. Beams incident on the second surface 924 are redirected via TIR and/or specular reflection towards the detector 906. In some instances, beams will be reflected off of both surfaces before being directed towards the detector 906.

As with the other couplers, depending upon the construction of the coupler 902, the optical beams may reflect one or more additional times via TIR or specular reflection within the optical coupler 902 before exiting the coupler and entering the detector 906. This may occur, for example, if there is a substantial vertical distance between the coupling surface 930 and the detector 906.

The optical beams exit the coupler 902 towards the detector 906 through a emitter/detector (E/D) interface 932. The beams then pass through an air gap 936, before entering the detector 906. In alternate implementations, there is no air gap and the emitters/detectors 906 are directly bonded or otherwise affixed to the E/D interface 932. The optical beams exiting the emitter 906 will traverse the reverse path through the coupler 602 into the waveguide 604 to those beams entering the detector 906 as described above In device 900, the E/D interface 932 is at a perpendicular angle with respect to the coupling surface 930. In other implementations an E/D interface that is at another angle (or zero angle) with respect to the coupling surface may be used instead. For beams to enter/exit the detectors/emitters 906 in such a construction, the beams reflect off of at least one other additional surface of the coupler that is at an angle with respect to the E/D interface. Generally, any angle can be accomplished between the E/D interface and the coupling surface using additional reflections off of surfaces of the coupler and/or using additional reflective coatings on surfaces of the coupler.

FIG. 9B illustrates the coupler 902 in isolation from the remainder of the device 900.

2. Ambient Light Prevention/Rejection

The optical touch-sensitive device 900 may include all of the same ambient light prevent/rejection mechanisms as described previously. In coupler 902, the dotted light represents the ambient light that enters the coupler 902. This ambient light is refracted away from the emitters/detectors 906 when it passes through the air gap 936 after the E/D interface 932.

3. Individual and Shared Couplers

Figure 9C:
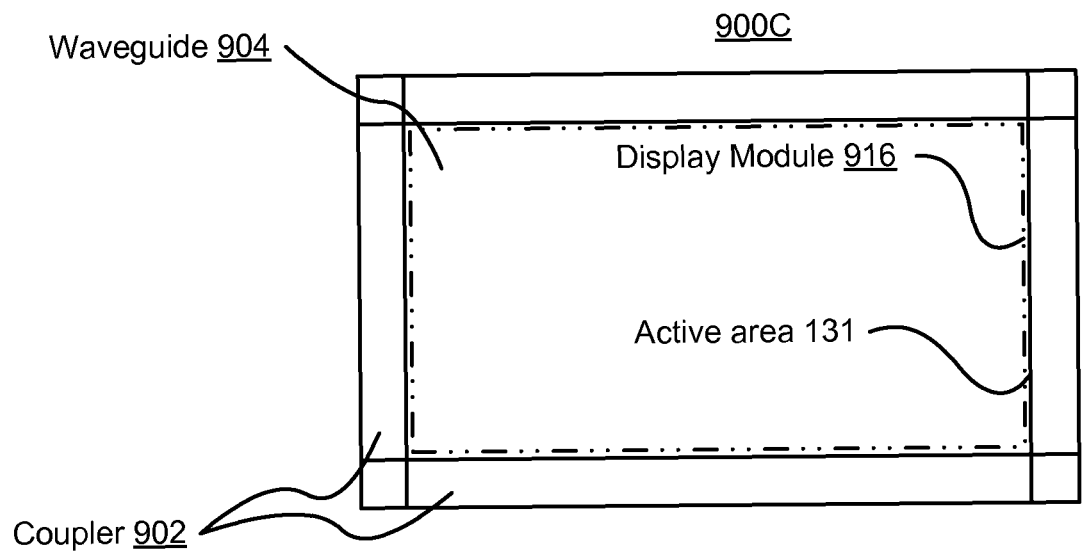
FIGS. 9C-9D are top views of an optical touch-sensitive device including an edge coupled optical coupler assembly.
Figure 9D:
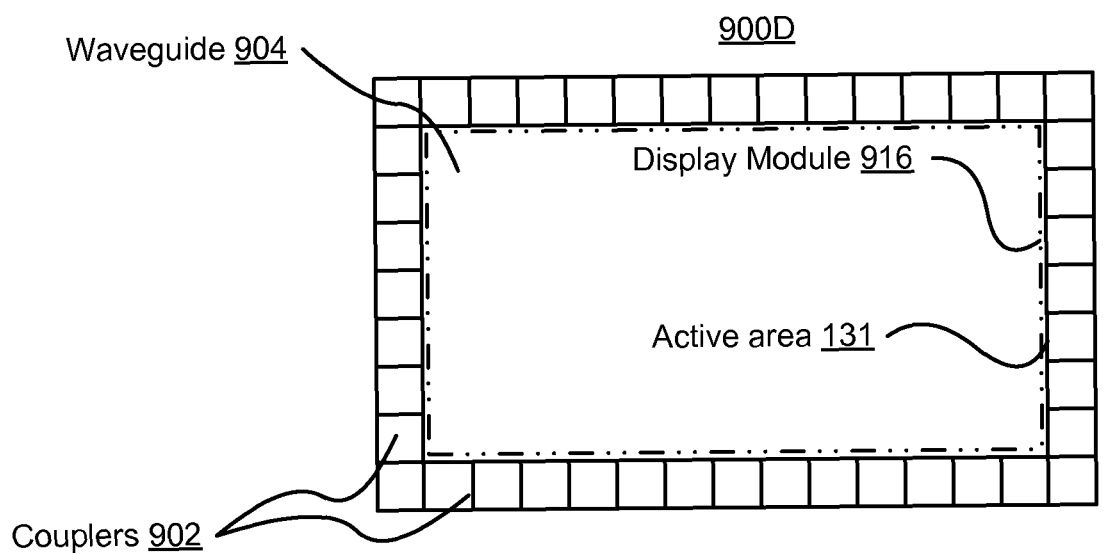

FIGS. 9C-9D are top views of an optical touch-sensitive device including an edge coupled optical coupler assembly. The top view illustrates the relative lateral extents of the waveguide 904, display module 916, and active area 131. As explained above, the waveguide 904 is bounded by the couplers 902 and covers the display module 916. The corner regions (unlabeled) may be extensions of the couplers 902, or made from other materials.

Similarly to FIG. 6C, FIG. 9C illustrates an implementation where relatively few couplers 902 (in this case four) are each shared between a number of emitters and/or detectors 906. Similarly to FIG. 6D, FIG. 9D illustrates an implementation where each emitter and detector has its own coupler 902. In another implementation, a single coupler may be shared between all emitters and detectors (not shown).

4. Beam Rotation within the Coupler

FIGS. 10A-10B, 11A-B, 12, and 14 are side views of various implementations of optical touch-sensitive device including edge coupled optical coupler assemblies configured to redirect light into emitters and directors oriented in a direction opposite to the optical waveguide. As with side coupled couplers, edge coupled couplers can be configured to rotate beams to any angle before coupling the beams into the emitters and detectors.

In coupler 1002, beams are redirected 180 degrees to travel the opposite direction from the direction they were traveling when they exited the waveguide 1004 through the coupling surface 1030. This is accomplished in coupler 1002 using only TIR with two additional surfaces of the coupler 1002, in addition to the two surfaces 1022 and 1024 that redirect the beams incident from the waveguide 1004 through the coupling surface 1030. The two additional surfaces are angled at nonzero angles with respect to each other such that the incident beams reflect via TIR off of one or more of the additional surfaces towards the detectors/emitters 1006. A disadvantage to using TIR reflection only to achieve this beam redirection is that it can require more space and a more complicated coupler design relative to other possible coupler designs.

In implementations of the coupler where light travels through the coupler along a vertical axis, such as in coupler 1002 in FIG. 10A, or through a vertical light pipe as illustrated in FIG. 8A, the coupler body may be rotated in any direction in the plane parallel to the top and bottom surfaces of the waveguide. For example, coupler 1002 may be rotated out of the plane of the illustrated page. As a result of this, the emitters and detectors 1006 do not necessarily need to be in the same vertical plane as the coupling surface 1030.

FIG. 10B illustrates the coupler 1002 in isolation from the remainder of the device 1000.

FIGS. 11A and 11B illustrate one possible alternative to coupler 1002 for achieving large angle beam redirections such as a 180 degree beam redirection. In coupler 1102, more surface of the coupler 1102 are covered with reflective coatings compared to coupler 1002. For example, surface 1024 and one or more additional surfaces may be coated with reflective coatings. As a result, beams are redirected within the coupler using specular reflection rather than TIR. As a result beams can be redirected through larger angles using comparatively less space than in a TIR-only equivalent coupler.

FIG. 11B illustrates the coupler 1102 in isolation from the remainder of the device 1100.

5. Light Pipes

FIGS. 12 and 14 illustrate additional coupler designs that incorporate light pipes. Coupler 1202 from FIG. 12 functions similarly to coupler 1102 from FIGS. 11A and 11B, except for the presence of a light pipe Coupler 1402 from FIG. 14 functions similarly to coupler 1302 from FIG. 13A-13B, except for the presence a vertical light pipe. As above, the light pipes may be implemented using parallel surfaces of the couplers 1202 and 1402 coated with reflective coatings 1218 and 1418.

6. Side and Edge Coupled Couplers

FIGS. 13A-13B, 14 are side views of an optical touch-sensitive device 1300 including an optical coupler assembly 1302 that is side coupled to an optical waveguide 1304, and that includes multiple portions that are edge coupled together. The first portion 1302a that is side coupled to the waveguide 1304 functions similarly to the side coupled couplers described with respect to FIGS. 6-8 above. The second portion 1302b that is edge coupled to the first portion 1302a functions similarly to the edge coupled couplers described with respect to FIGS. 9-12 above, except that the first portion 1302a performs the function of the waveguide.

IV. Applications.

The touch-sensitive devices described above can be used in various applications. Touch-sensitive displays are one class of application. This includes displays for tablets, laptops, desktops, gaming consoles, smart phones and other types of compute devices. It also includes displays for TVs, digital signage, public information, whiteboards, e-readers and other types of good resolution displays. However, they can also be used on smaller or lower resolution displays: simpler cell phones, user controls (photocopier controls, printer controls, control of appliances, etc.). These touch-sensitive devices can also be used in applications other than displays. The "surface" over which the touches are detected could be a passive element, such as a printed image or simply some hard surface. This application could be used as a user interface, similar to a trackball or mouse.

V. Additional Considerations

The figures depict embodiments of the present invention for purposes of illustration only. One skilled in the art will readily recognize from the following discussion that alternative embodiments of the structures and methods illustrated herein may be employed without departing from the principles of the invention described herein.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An optical touch-sensitive device comprising:
   a planar optical waveguide extending over a surface of a display, the waveguide having a top surface and a bottom surface;
   emitters and detectors arranged along a periphery of the display and below the bottom surface of the waveguide;
   an optical coupler assembly positioned along the periphery of the display coupled below the bottom surface of the waveguide, the optical coupler assembly coupling optical beams produced by the emitters into the waveguide and out of the waveguide to the detectors, the optical beams propagating through the waveguide via total internal reflection (TIR) off of the top and bottom surfaces of the waveguide wherein touches on the top surface of the waveguide disturb the optical beams, the touch-sensitive device determining touch events based on the disturbances, the optical coupler assembly comprising:
   an upper surface and a lower surface, both formed parallel to the bottom surface of the waveguide, the upper surface forming an interface at which light enters from or exits to the waveguide,
   a diagonal surface joining both the upper and lower surfaces and formed at an acute angle to the lower surface and an obtuse angle to the upper surface, measured within the optical coupler assembly, and
   wherein one of the diagonal surface and the lower surface forms an interface at which light enters from or exits to an emitter or a detector, the other one of the diagonal surface and the lower surface being a surface upon which TIR of light occurs within the optical coupler assembly.

2. The optical touch-sensitive device of claim 1 wherein the optical coupler assembly comprises a first portion and a second portion, the first portion side optically coupled to the waveguide, the second portion butt coupled to the first portion, the second portion optically coupled to the emitters and detectors.

3. The optical touch-sensitive device of claim 1 wherein the emitters and detectors are oriented to emit and receive, respectively, optical beams in a direction substantially perpendicular to the plane of the waveguide.

4. The optical touch-sensitive device of claim 1 wherein the optical coupler assembly is configured such that optical beams passing through the optical coupler exit in a direction rotated approximately 90 degrees from the direction they entered the optical coupler.

5. The optical touch-sensitive device of claim 1 wherein the emitters and detectors are oriented to emit and receive, respectively, optical beams in a direction substantially parallel to the plane of the waveguide.

6. The optical touch-sensitive device of claim 1 wherein the optical coupler assembly is configured such that optical beams passing through the optical coupler assembly exit in a same direction that they entered the optical coupler assembly.

7. The optical touch-sensitive device of claim 1 wherein the optical beams entering the optical coupler assembly exit the optical coupler assembly along either a same direction or a reversed direction relative to the direction of entry into the optical coupler assembly.

8. The optical touch-sensitive device of claim 1 wherein the optical coupler assembly, emitters, and detectors are located outside a side edge of the display.

9. The optical touch-sensitive device of claim 1 wherein the optical coupler assembly comprises a light pipe configured to redirect optical beams a distance in a direction substantially perpendicular to the plane of the waveguide.

10. The optical touch-sensitive device of claim 9 wherein the light pipe comprises one or more reflective surfaces.

11. The optical touch-sensitive device of claim 1 wherein the optical coupler assembly comprises:
a planar coupling surface, wherein optical beams couple to the waveguide through the coupling surface at greater than a critical angle with respect to a normal from the bottom surface of the waveguide so that said optical beams are totally internally reflected within the waveguide; and
a planar light rejection surface, wherein ambient light that enters the optical coupler assembly through the coupling surface at less than the critical angle strikes the planar light rejection surface at less than the critical angle and exits the optical coupler assembly.

12. The optical touch-sensitive device of claim 11 wherein the planar light rejection surface is optically parallel to the planar coupling surface, and the optical coupler assembly is constructed of a material that has a same index of refraction as the waveguide.

13. The optical touch-sensitive device of claim 1 comprising an infrared transmissive layer optically coupled between the bottom surface of the waveguide and the optical coupler assembly, the light filtering layer configured to filter visible ambient light.

14. The optical touch-sensitive device of claim 1 wherein the optical coupler assembly comprises:
a planar coupling surface, wherein optical beams couple to the waveguide through the coupling surface at greater than a critical angle with respect to a normal from the bottom surface of the waveguide so that said optical beams are totally internally reflected within the waveguide; and
a light shield surface optical coupled between the bottom surface of the waveguide and the optical coupler assembly, the light shield configured to block ambient light incident on the emitters and detectors through the waveguide at an angle less than the critical angle.

* * * * *